(12) United States Patent
Sakaguchi et al.

(10) Patent No.: US 8,607,245 B2
(45) Date of Patent: Dec. 10, 2013

(54) DYNAMIC PROCESSOR-SET MANAGEMENT

(75) Inventors: Ryohei Leo Sakaguchi, Kobe Hyogo (JP); Daniel Edward Herington, Dallas, TX (US); Seiji Inokuchi, Kobe Hyogo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 916 days.

(21) Appl. No.: 12/466,416

(22) Filed: May 15, 2009

(65) Prior Publication Data
US 2010/0293358 A1 Nov. 18, 2010

(51) Int. Cl.
*G06F 9/46* (2006.01)

(52) U.S. Cl.
USPC .......................................................... 718/106

(58) Field of Classification Search
USPC .......................................................... 718/106
See application file for complete search history.

(56) References Cited

U.S. PATENT DOCUMENTS

| | | | |
|---|---|---|---|
| 6,912,493 B1* | 6/2005 | Scheel et al. ..................... 703/2 |
| 2003/0236690 A1* | 12/2003 | Johnston-Watt et al. ......... 705/7 |
| 2005/0108714 A1* | 5/2005 | Geye et al. .................... 718/100 |
| 2006/0095908 A1 | 5/2006 | Norton |
| 2006/0168254 A1 | 7/2006 | Norton |
| 2008/0084827 A1 | 4/2008 | Archer et al. |

* cited by examiner

Primary Examiner — Mengyao Zhe

(57) ABSTRACT

A dynamic processor-set management method provides for transferring a process from a shared processor set to a dedicated processor set when that process meets a first utilization-related criterion. The method also provides for transferring a process between from a dedicated processor set to a shared processor set when that process meets a second utilization-related criterion. The processor sets are mapped to processor cores that execute the processes.

20 Claims, 5 Drawing Sheets

DYNAMIC PROCESSOR-SET MANAGEMENT

BACKGROUND

Herein, related art is described to facilitate understanding of the invention. Related art labeled "prior art", if any, is admitted prior art; related art not labeled "prior art" is not admitted prior art.

When multiple applications are being run, multi-core computer systems afford flexibility in mapping computing processes to processor cores for execution. The challenge is to perform this mapping so as to maximize performance.

DETAILED DESCRIPTION

The present invention efficiently allocates cores to processes by 1) dynamically mapping processes to logical processor sets (PSETS) as a function of core utilization by the processes, and 2) mapping PSETS to cores. The mapping is dynamic in that a process is transferred between shared and dedicated PSETs as a function of the process's demand (as projected from utilization data associated with the process. The complex task of optimally assigning processes to cores is broken into two easier-to-address tasks (assigning PSETs to cores and assigning processes to PSETs). As a result, more work can be accomplished by a given number of cores, which, in turn, means greater performance.

Figure 1:
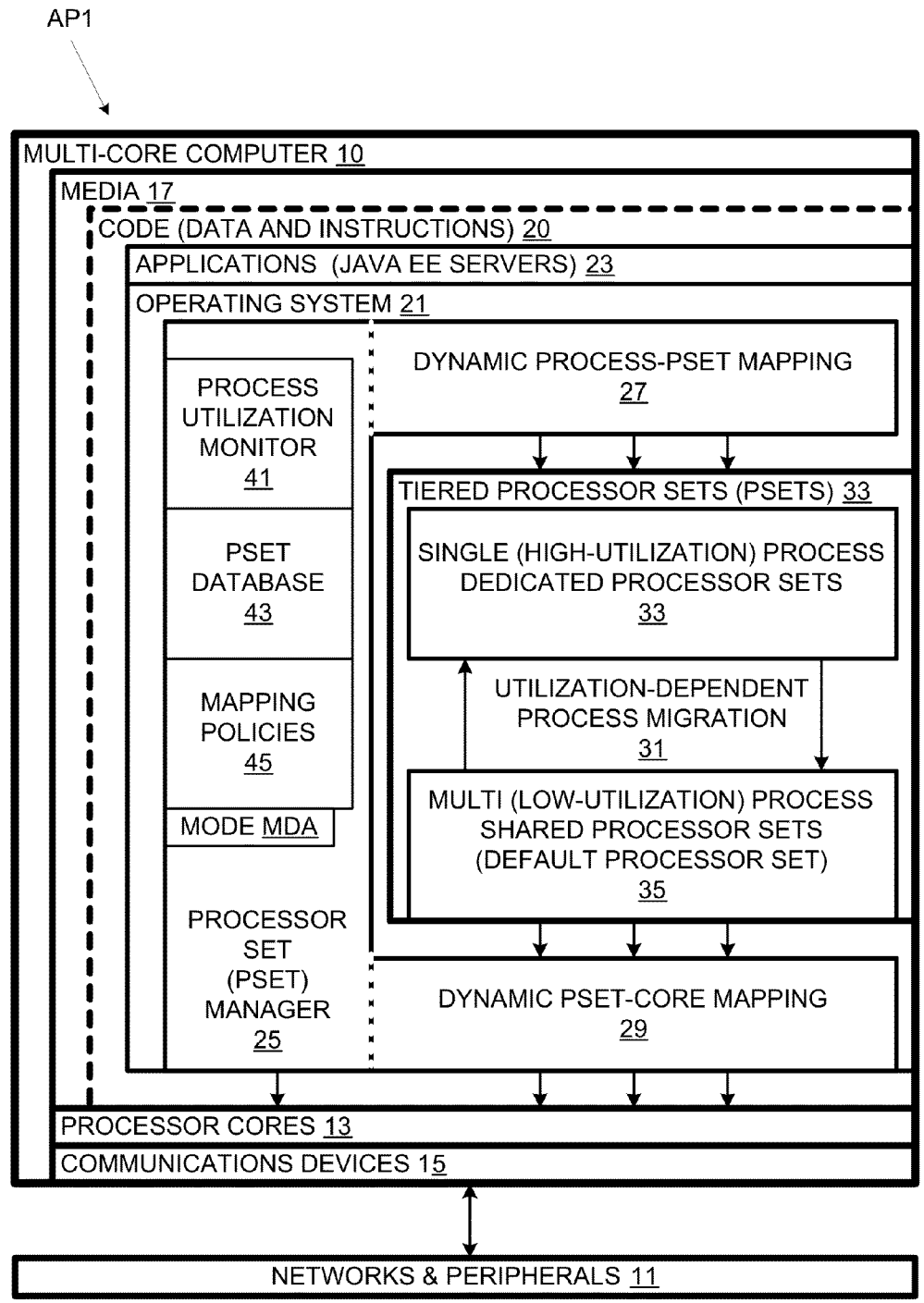
FIG. 1 is a schematic diagram of a system including a multi-core computer implementing an embodiment of the present invention.

In accordance with an embodiment of the invention as depicted in FIG. 1, a computer system API includes a multi-core computer 10 and a network and networked peripherals 11 (e.g., printers, hard disks). Computer 10 includes processor cores 13, communications devices 15, and computer-readable storage media 17. In the illustrated embodiment, cores 13 number sixteen; in alternative embodiments, other numbers of cores are provided. Communications devices 15 include network interface cards (NICs), host-bus adapters (HBAs), etc.

Media 17 is tangibly encoded with code 20 defining computer-readable data and computer-executable instructions. Code 20 defines an operating system 21 and applications 23, in this case, Java EE servers. Operating system 21 includes a processor-set manager 25, providing for dynamic process-PSET mapping 27 and dynamic PSET-core mapping 29. Dynamic process-PSET mapping 27 involves transferring or migrating 31 processes between dedicated logical processor sets (D-PSETs)33 and shared logical processor sets (S-PSETs)35 at least in part as a function of utilization.

Figure 2:
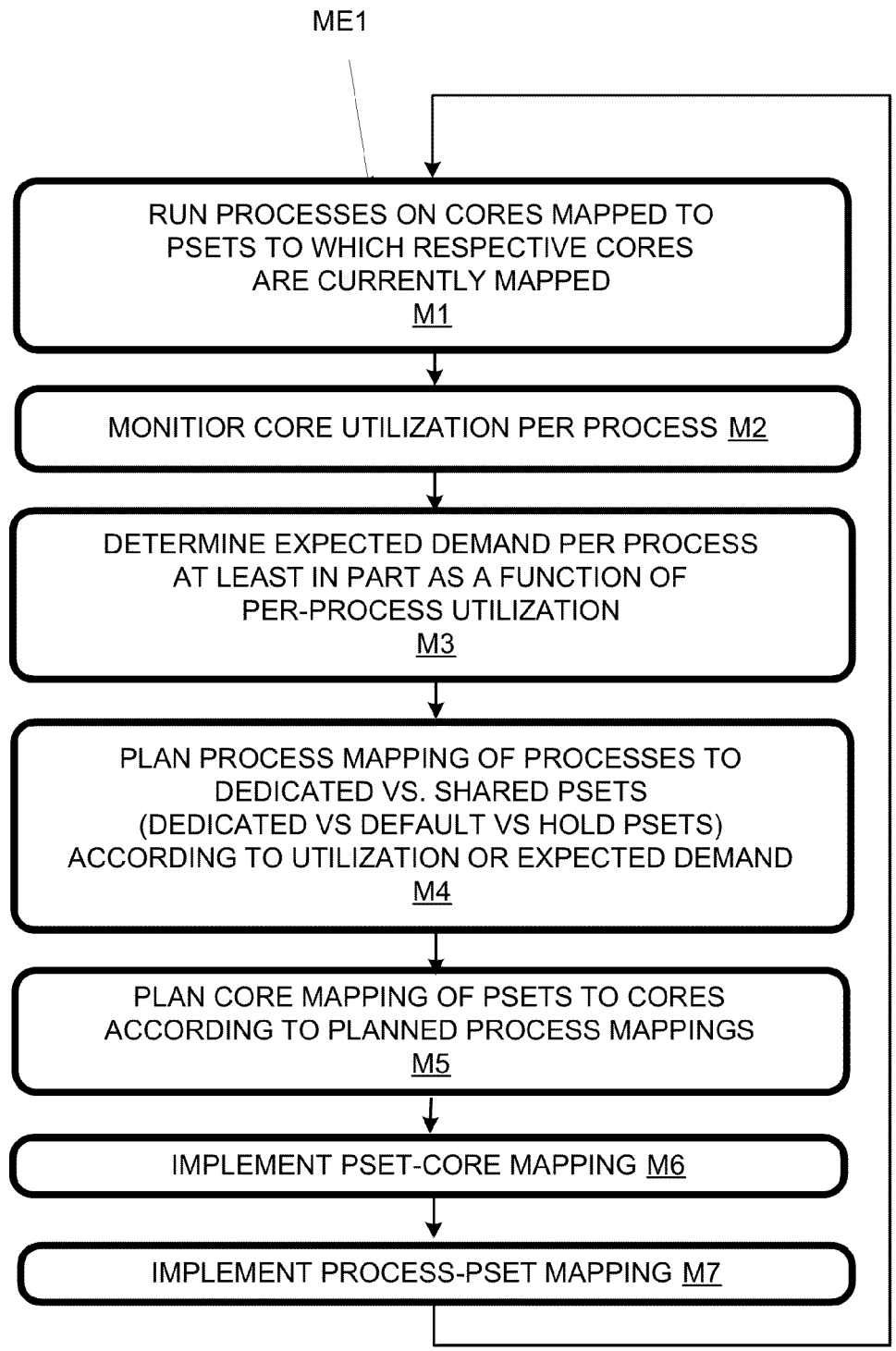
FIG. 2 is a method in accordance with an embodiment of the invention.

Pursuant to the foregoing, computer 11 provides for implementation of a method ME1, flow charted in FIG. 2. Method segment M1 involves running processes on cores mapped to PSETs to which respective cores are currently mapped. The current mapping can change periodically, e.g., every five seconds. Method segment M2 involves, while the processes are running, monitoring utilization on a per-process basis. This monitoring provides utilization values for each process for each period; for example, utilization percentages can be determined every five seconds. These utilization values are used to project an expected demand for each process for the next execution period. In the simplest case, it can be assumed that the utilization of the past period will be the demand for the period for which planning is occurring. Alternative, utilization trends can be assessed and use to project demand for the next execution period.

Method segment M4 involves planning an updated process-to-PSET mapping. This planning is performed at least in part as a function of utilization and/or expected demand. Since expected demand is at least in part a function of utilization it is general to say that method segment M4 involves planning a mapping of processes to PSETs at least in part as a function of utilization. In addition to utilization, the previous mapping can be considered with the aim of reducing unnecessary transfers of a PSET (e.g., from one D-PSET to another D-PSET). During this process mapping, PSETs may be activated, resized, and deactivated.

Method segment M5 involves planning an updated PSET-to-core mapping. This mapping takes into account newly activated, newly resized, and newly deactivated PSETs. Otherwise, the new mapping can take into account the previous mapping to minimize reassigning of PSETs to cores.

At method segment M6, the PSET-to-core mapping is implemented. At method M6, the planned process-PSET mapping is implemented. From method segment M6, method ME returns to method segment M1 so that processes are run on cores according to the new current mappings of proceses to PSETs and PSETs to cores. Note that the process mapping precedes core mapping during planning, but follows core mapping during implementation. Process mapping precedes core mapping during planning because the core mapping depends logically on the process mapping (e.g., the number of cores to which a D-PSET is assigned depends on the expected utilization for the process assigned to that D-PSET). Process mapping follows core mapping during implementation in part because processes cannot run on PSETs to which resources have not yet been assigned. For example, if a process is to be transferred from an S-PSET to a new D-PSET, the new D-PSET must be assigned to a core or set of cores before the process can run on the new D-PSET.

The monitoring involved in method segment M1 is performed by a process utilization monitor 41 of manager 25 (FIG. 1). The transfers of method segments M1 and M2 can cause PSETs to be activated, resized, and deactivated; the status of each PSET is represented in PSET database 43. The mappings of method segments M2 and M3 are performed in accordance with policies 45 of manager 25. Policies 45 provide for various modes of operation, the active one of which is indicated as mode MDA in FIG. 1.

Figure 3:
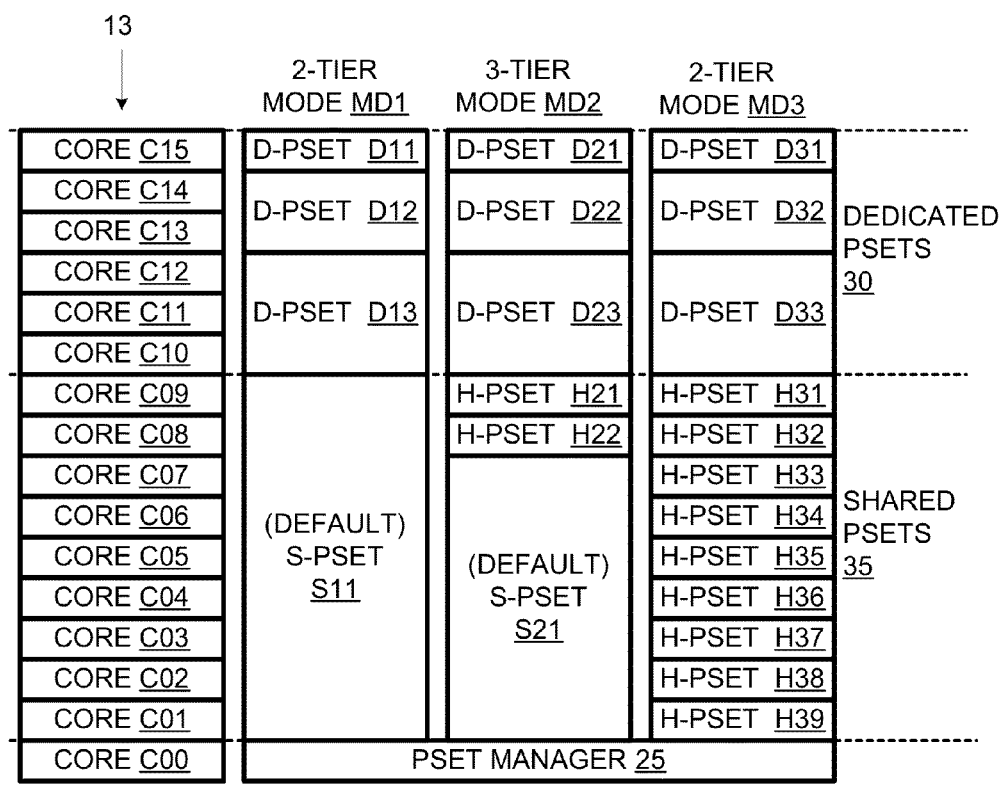
FIG. 3 is a diagram showing different modes of assigning processor sets to processor cores in accordance with the method of FIG. 2.

Three of these modes MD1-MD3 are represented in FIG. 3. Mode MD1 involves a two-tier arrangement of PSETs: relatively high utilization processes are mapped to D-PSETs, while relatively low utilization processes are mapped to a single default S-PSET. As indicated in FIG. 3, cores 13 include sixteen cores C00-C15. In each mode, MD1-MD3, manager 25 is mapped to core C00, so fifteen cores are available for mappings to PSETs.

Mode MD1 is a two-tier mode. Relatively high utilization processes are mapped to D-PSETs, e.g., D-PSETs D11, D12, and D13, while relatively low utilization processes are mapped to a default S-PSET S11. As indicated by the fact that D-PSETs D11-D13 are assigned to different numbers of cores, D-PSETs can be resized according to the utilization associated with the process mapped to the D-PSET. Also, the number of D-PSETs can vary according to the number of high-utilization processes. Default S-PSET S11 varies in size to consume all cores not assigned to a D-PSET or to PSET manager 25.

Mode MD2 is a three-tier mode in that there are two tiers of S-PSETS. The bottom tier contains a single default S-PSET, while the middle tier includes a whole number of "hold" PSETs, so called because they serve to hold processes on their way between a default PSET and a D-PSET. In the case shown in FIG. 2, there are three D-PSETs, D21, D22, and D23, which correspond in number and size to D-PSETS D11-D13 of mode MD1. Hold S-PSETs H21 and H22 are fixed size, corresponding to a single core, but can hold one or more processes. Default S-PSET S21 can hold a whole number of processes and consumes all cores not consumed by manager 25, D-PSETs and hold S-PSETs.

Mode MD3 is a two-tier mode in which all S-PSETs are fixed-size (in this case, single-core) multi-process hold PSETs (H-PSETs); there is no re-sizeable S-PSET such as default S-PSETs S11 and S12. Thus, in the case shown in FIG. 2, there are three D-PSETs D31-D33 associated with one, two, and three cores respectively, and nine H-PSETs, each corresponding to a single core. The number of hold PSETs is the number of cores not used by manager 25 or by a D-PSET.

Figure 4:
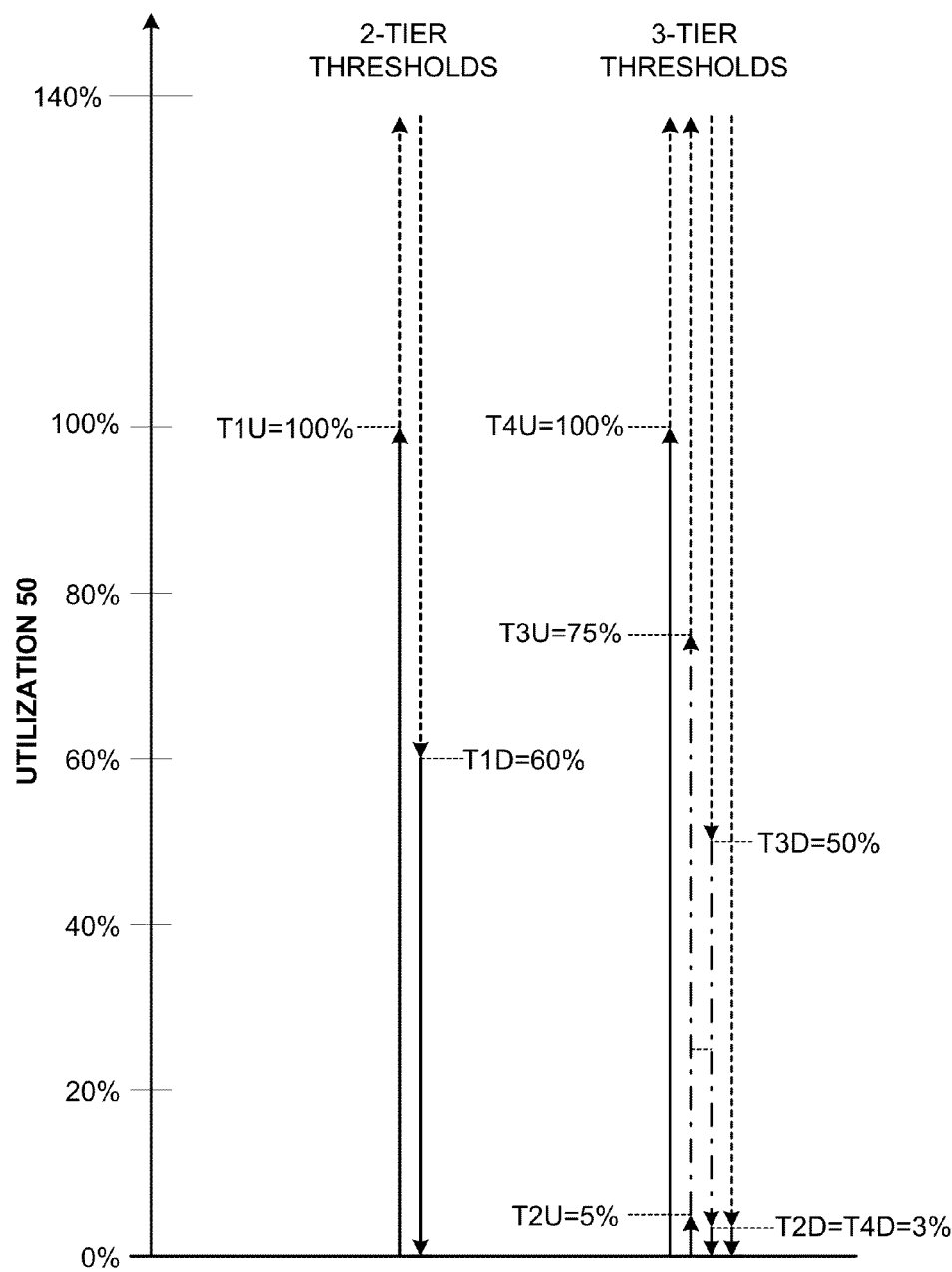
FIG. 4 is a pair of mappings of processes to PSETs and PSETs to cores.

Modes MD1-MD3 represent just three of many possible modes that can be defined by policies 45. In addition to defining modes, policies 45 define the criterion for mapping and transferring processes to PSETs. FIG. 4 is a graph of utilization 50 indicating sets of utilization percentage thresholds for transferring a process from one PSET to another. Separate graph sections are used for the three-tier mode versus the pair of two-tier modes.

Utilization thresholds or criteria for the two-tier modes can be, by way of example, T1U=100% utilization for transferring from an S-PSET to a D-PSET, and T1D=60% for transferring a process from a D-PSET to an S-PSET. The up-going threshold is higher than the corresponding down-going threshold to provide some hysteresis to limit back and forth transfers where utilization hovers around a threshold.

There are more thresholds for a three-tier mode. T2U=5% is the threshold for transferring from a default PSET to a hold PSET, while T2D=3% is the threshold in the reverse direction, again providing for hysteresis. T3U=75% is the up-going threshold from a hold PSET to a D-PSET, while T3D=50% serves as the corresponding down-going threshold. Since utilization is measured periodically, it is possible for a threshold to be skipped. In such a case, T4U=100% is the up-going threshold from a default S-PSET to a D-PSET, and T4D=3% is the down-going threshold from a D-PSET to a default S-PSET.

Figure 5:
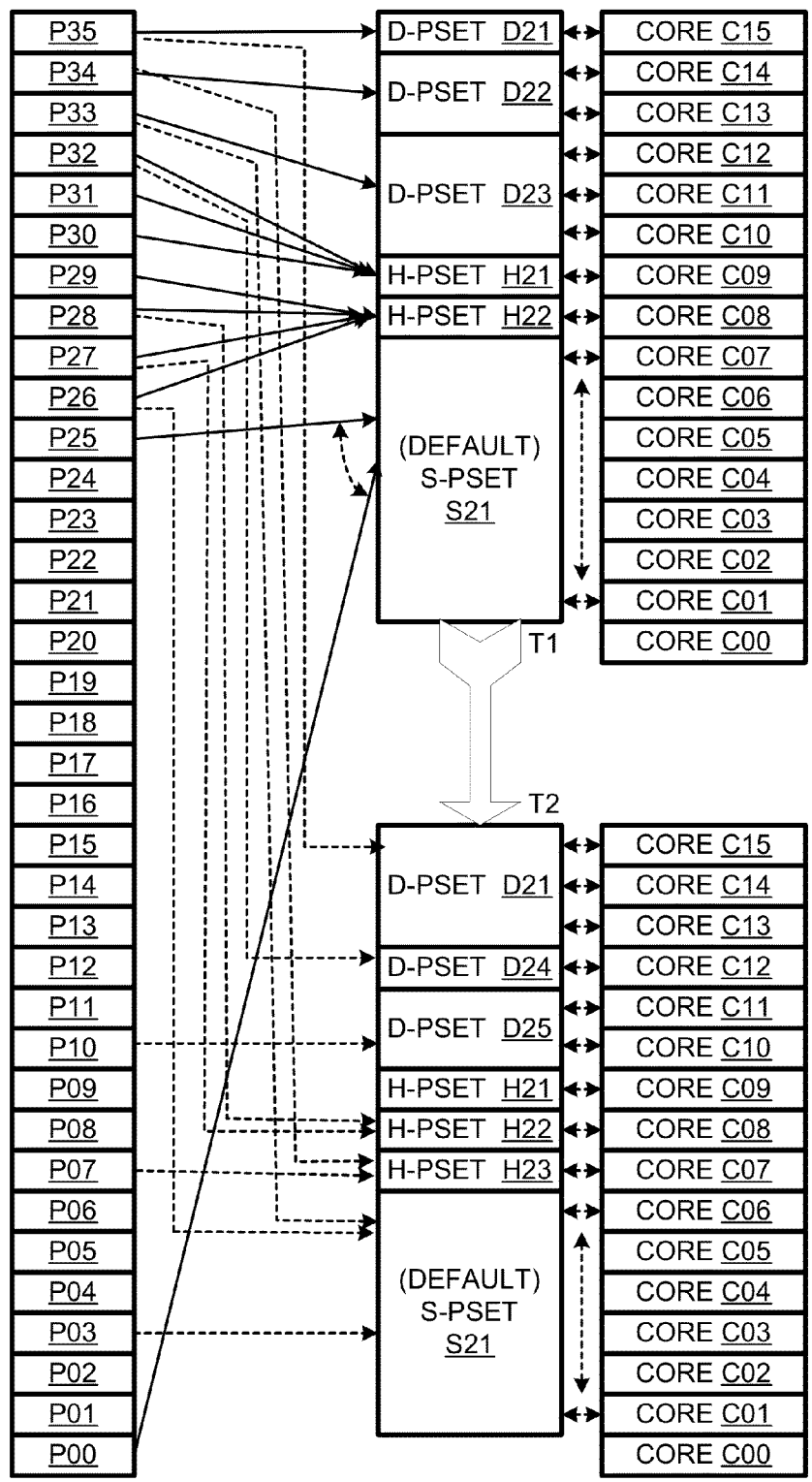
FIG. 5 is a diagram showing particular utilization values at which processes are transferred between processor sets in particular modes of an embodiment of the invention.

The dynamic process and core mappings provided by PSET manager 25 are represented in FIG. 5 in the form of a transition between mappings from a time T1 to a time T2. At time T1: processes P00-P25 are mapped to default S-PSET S21, which is mapped to cores C01-C07; processes P26-P29 are mapped to H-PSET H22; processes P30-P32 are mapped to H-PSET H23; and processes P33-P35 are mapped to respective D-PSETs D21-D23. Process P03 is representative of a preponderance of processes P00-P25 that remain mapped to default PSET S21 as their utilizations have remained below T2U=5%; default S-PSET S21 has been resized down from seven cores to six due to an increment in the number of cores required for D-PSETs and H-PSETs. Process P35 remains mapped to D-PSET D21, which has been resized upward from one core to three cores as utilization has risen from between 50%-100% up to between T3D=200%-300%.

Process P27 is representative of processes P28-P31, which remain mapped to their respective H-PSETs as their utilization have not risen above T3U=75% or fallen below T2D=3%. The size of the H-PSETs is fixed at one core each, although collectively they have expanded from two cores to three cores as process P34 could not fit within either of H-PSETs H21 or H22 without exceeding a 90% utilization threshold. Process P28 has been moved from H-PSET H22 to new H-PSET H23 to keep the total utilization for PSET H22 below 90%.

Process P34 has been transferred from D-PSET D22 to new H-PSET H23, as its utilization has dropped below 50%. New H-PSET H23 is mapped to core C07. D-PSET D22 has been deactivated and is no longer assigned to a core, although it remains represented in database 43 (FIG. 1). Process P33 has been transferred from D-PSET D23 to default S-PSET S21 as its utilization has dropped below 3%; D-PSET D23 has been deactivated and is no longer assigned to any cores.

Process P32 has been "promoted" from H-PSET H21 to a new one-core D-PSET D24 as its utilization has reached or exceeded T3U=75% but has not reached 100%. Process P26 has been transferred from H-PSET H22 to default S-PSET S21. Process P10 has been transferred from default S-PSET S21 to a new default D-PSET D25, which is assigned to two cores, as its utilization has passed T4U=100%. Process P07 has been transferred from default S-PSET S21 to new H-PSET H23 as its utilization has increased from below 5% to between 5%-100%. In general, there could be several different state transitions from S-PSET to D-PSET according to the processes utilization. For example, for 75%-100%, move to a 1-core D-PSET, for larger utilizations, the number of cores assigned to the target D-PSET can be a counting number n where: $n*100\% \leq \text{percent utilization} < (n+1)*100\%$.

The listed thresholds were determined empirically to work well under certain circumstances. However, other thresholds can be used as well. Also, the thresholds need not be the same for all processes. For examples, higher priority workloads may have lower thresholds for moving up a tier than lower priority workloads. In such cases, utilization is not the only factor in determining transfers. In general, one can say the transfer criteria are "utilization-related" in that other factors may be involved in the determination of when and where to transfer.

In addition, there can be different thresholds for determining when to increase or decrease the size of a PSET. For example, as utilization approaches 200%, a D-PSET can expand from two cores to three cores. Note that, if the threshold for transferring to a D-PSET is 100%, the initial size of the D-PSET is typically two cores. However, where a lower up-going threshold is set for transferring from an S-PSET to a D-PSET, the initial size of the D-PSET can be one core.

For modes MD2 and MD3, H-PSETs have a fixed size of one core. For other embodiments, this fixed size can be two or more cores. Since a Java EE server process will try to use all available cores and caches, data will proliferate if multiple caches are involved. Restricting processes to H-PSETs to one core each, minimizes such data proliferation. However, in processors in which cores can share a cache, an H-PSET can be assigned on a per-cache basis. In other words, if two cores share a cache, the H-PSET size can be fixed at two cores.

A "processor set" is a logical construct characterized by a number of processor cores to which the processor set can be mapped. In the illustrated embodiment, a processor set can be mapped to whole number of cores. Alternative embodiments permit processor sets to be mapped to non-integer numbers of cores. Herein, the conceptualization of a processor set permits empty processor sets; this conceptualization is different from but substantially equivalent to a conceptualization in which processor sets are created and destroyed when a process is assigned to or de-assigned from a processor set. "Transferring" a process means "remapping" that process. "That", when used in the claims, means "the most immediately aforesaid".

Herein, a "dedicated" processor set accepts at most one process at a time. Herein, a "shared" processor set is a set to which more than one process can be mapped at a time. A "default" processor set is a shared processor set that is unique either because there are no other shared processor sets or because it differs from other shared processor sets. A "hold" processor set is a shared processor set for which the number of cores to which it can be assigned is fixed, usually at one core. Herein, the two-tier embodiments include either a resizable default processor set or one or more fixed-size hold processor sets. The three-tier embodiment provides for a default processor set and hold processor sets.

A utilization-related parameter is a process parameter a value of which varies at least in part as a function of utilization associated with the associated process. A utilization-related criterion is a criterion that can be met when a threshold for a value of a utilization-related parameter value is met; however, other criteria may have to be met as well. For example, the current mapping of a process to a processor set may affect whether that process will be transferred to a different processor set. These and other variations upon and modifications to the illustrated embodiment are provided by the present invention, the scope of which is defined by the following claims.

What is claimed is:

1. A dynamic processor-set management method comprising:
    process mapping processes to logical processor sets so that:
        when processor utilization by a process increases to meet a first utilization-related criterion, it is transferred from a shared processor set of logical processors to which set that and another process had been concurrently mapped to a dedicated processor set of logical processors to which set only that process will be mapped; and
        when processor utilization by a process decreases to meet a second utilization-related criterion, that process is transferred from a dedicated processor set of logical processors to which set only that process had been mapped to a shared processor set of logical processors to which set that process will be concurrently mapped with another process;
    core mapping said processor sets to processor cores; and
    executing processes mapped to a processor set on the core or cores to which that processor set is mapped.

2. A method as recited in claim 1 wherein said core mapping involves adjusting the number of cores to which a dedicated processor set mapped to exactly one process is mapped as a function of the value of a utilization-related parameter associated with that one process, said first utilization-related criterion being based on a first processor-utilization threshold, said second utilization-related criterion being based on a second processor-utilization threshold lower than said first processor-utilization threshold.

3. A method as recited in claim 1 wherein said processor sets include exactly one shared processor set to which more than one process is mapped, said core mapping including adjusting the number of cores to which said shared processor set is mapped as a function of the total number of cores to which dedicated processor sets are mapped.

4. A method as recited in claim 1 wherein said processor sets include one or more shared processor sets of logical processors, said core mapping involving mapping each of said shared processor sets to exactly one core.

5. A method as recited in claim 1 wherein said process mapping involves transferring a process from a default shared processor set to a hold shared processor set of logical processors when that process meets a third utilization-related criterion, and transferring a process from said hold shared processor set to said default processor set when that process meets a fourth utilization-related criterion.

6. A method as recited in claim 5 wherein said core mapping further involves not mapping any hold processor set to more than one core.

7. A method as recited in claim 5 wherein said transferring of a process from said shared processor set involves transferring that process from said hold shared processor set.

8. A method as recited in claim 7 wherein said process mapping involves transferring a process from said default shared processor set to a dedicated processor set so that only that process is mapped to that dedicated processor set when said process meets a fifth utilization-related criterion.

9. A method as recited in claim 8 wherein said process mapping involves transferring a process from a dedicated processor set to a default processor set when said process meets a sixth utilization-related criterion.

10. A method as recited in claim 1 wherein at least some of said processes are associated with Java Enterprise Edition workloads.

11. A system comprising non-transitory computer-readable storage media encoded with code defining a processor-set manager that, when executed, provides for defining and dynamically managing logical processor sets of logical processors, said logical processor sets including dedicated processor sets and at least one shared processor set, said managing involving mapping at most one process to each of said dedicated processor sets and one or more processes to a shared processor set, said managing further including:
    transferring
        a process from a shared processor set of logical processors to which set that and another process have been concurrently mapped to a dedicated processor set of logical processors to which set only that process will be mapped when processor utilization by that process increases to meet a first utilization-related criterion, and
        a process from a dedicated processor set of logical processors to which set only that processor has been mapped to a shared processor set of logical processors to which that and another processor will be concurrently mapped when that processor utilization by that process decreases to meet a second utilization-related criterion, and
    mapping said processor sets to processor cores.

12. A system as recited in claim 11 further comprising said cores for executing said processor-set manager and said processes so as to effect said managing, said first utilization criterion being based on a first processor-utilization threshold, said second utilization criterion being based on a second processor-utilization threshold lower than said first processor-utilization threshold.

13. A system as recited in claim 11 wherein said second utilization-related criterion corresponds to a lower utilization value than does said first utilization-related criterion.

14. A system as recited in claim 11 wherein said mapping of processor sets to cores involves changing the number of cores to which a dedicated processor set is mapped as a function of a utilization-related parameter associated with a process mapped to that dedicated processor set.

15. A system as recited in claim 11 wherein said managing involves changing the number of cores to which said first shared processor set is mapped.

16. A system as recited in claim 11 wherein said managing involves mapping each shared processor set to at most one processor core.

17. A system as recited in claim 11 wherein said shared processor sets include a default shared processor set and one or more hold shared processor sets, said managing involving transferring said first process from said default shared processor set to a first hold shared processor set when that process meets a third utilization-related criterion, and transferring said first process from said first hold shared processor set when said first process meets a fourth utilization-related criterion.

18. A system as recited in claim 17 wherein said managing includes:
- transferring a process from a hold shared processor set to a dedicated processor set when that process meets said first utilization-related criterion;
- transferring a process from a dedicated processor set to a hold shared processor set when that process meets said second utilization-related criterion;
- transferring a process from said default shared processor set to a dedicated processor set when that process meets a fifth utilization-related criterion; and
- transferring a process from a dedicated processor set to said default shared processor set when that process meets a sixth utilization-related criterion.

19. A system as recited in claim 11 wherein at least some of said processes are associated with Java Enterprise Edition workloads.

20. A system as recited in claim 19 wherein said code defines said workloads.

\* \* \* \* \*